United States Patent [19]

Campbell

[11] Patent Number: 5,365,836
[45] Date of Patent: Nov. 22, 1994

[54] APPARATUS FOR WRAPPING ROUND BALES

[75] Inventor: Willis R. Campbell, Olathe, Kans.

[73] Assignee: Ford New Holland, Inc., New Holland, Pa.

[21] Appl. No.: 212,532

[22] Filed: Mar. 14, 1994

[51] Int. Cl.[5] .................. B65B 63/04; A01D 39/00
[52] U.S. Cl. ............................ 100/5; 53/118;
                                 53/587; 56/341; 100/15; 100/88
[58] Field of Search ............ 100/5, 15, 88; 53/118,
                                 53/587; 56/341

[56] References Cited

U.S. PATENT DOCUMENTS

| 3,914,926 | 10/1975 | Braunberger et al. | 56/341 |
| 4,167,844 | 9/1979 | Freimuth et al. | 56/343 |
| 4,262,478 | 4/1981 | Pentith | 100/88 X |
| 4,366,665 | 1/1983 | VanGinhoven et al. | 56/341 |
| 4,563,854 | 1/1986 | Ackermann et al. | 53/118 |
| 4,597,254 | 7/1986 | Bowden, Jr. | 56/341 |
| 4,768,431 | 9/1988 | Merritt, III et al. | 100/88 |
| 5,072,667 | 12/1991 | Yeardley | 100/5 X |

FOREIGN PATENT DOCUMENTS

2911441  9/1980  Germany ........................ 100/5

Primary Examiner—Stephen F. Gerrity
Attorney, Agent, or Firm—Frank A. Seemar; Larry W. Miller

[57] ABSTRACT

Apparatus for forming a cylindrical bale of crop material having a generally round cross section, comprising a pick up for picking up crop material as the apparatus travels across a field. The apparatus is adapted to feed the picked up crop material into a bale forming chamber where it is formed into a cylindrical package having a generally round cross section, and then wrapped with at least two separate strips of self adhering tape around the outer periphery to encompass such package and form a bale having a generally round cross section, conforming substantially to the cross section of the cylindrical package.

16 Claims, 6 Drawing Sheets

APPARATUS FOR WRAPPING ROUND BALES

FIELD OF THE INVENTION

The present invention relates generally to round balers and more particularly to new and useful apparatus for wrapping cylindrical packages of crop material to form round bales.

BACKGROUND OF THE INVENTION

Round balers commonly have either a fixed or an expandable bale forming chamber between opposing vertical sidewalls. The chamber in many instances is defined by a floor and a transverse wall which comprises a continuous apron and/or a plurality of rolls. Frequently the apron consists of an array of side-by-side belts trained around a series of rollers extending between the sidewalls and the floor consists of a roller or a continuous belt. During field operation, crop material such as hay is picked up from the ground and fed into the expandable chamber. The volume of crop material increases continuously in the chamber to form a cylindrical package which is then wrapped to form a completed bale which is subsequently ejected onto the ground.

Balers of the type mentioned above employ various means for wrapping the package of crop material formed in the chamber. Prior art apparatus commonly utilize either twine or net to secure the package into a bale. Plastic sheet material has also been used.

Exemplary of prior art round baler apparatus in which net wrapping is employed is the system shown in U.S. Pat. No. 4,768,431, issued Sep. 6, 1988 in the name of John Merritt, et al. Typical prior art apparatus in which twine wrapping is utilized is illustrated by U.S. Pat. No. 4,167,844, issued Sep. 18, 1989 in the name of John H. Freimuth, et al, and a prior art round baler using plastic as the wrapping medium is disclosed in U.S. Pat. No. 4,366,665, issued Jan. 4, 1983 in the name of Robert M. VanGinhoven, et al.

Although the above mentioned prior art round bale wrapping systems have met with varying degrees of success and currently they are serving the purposes for which they are intended, there is a need in the baling art, as in any art, for a new and useful technique having desirable enhancements.

SUMMARY OF THE INVENTION

An important object of the present invention is to provide new and improved round bale wrapping apparatus.

In pursuance of this and other important objects the present invention contemplates unique apparatus employed in a baler having lower bale forming means, upper bale forming means cooperating with the lower bale forming means to define a bale forming chamber, means for feeding crop material into the bale forming chamber to form a cylindrical package of crop material, and a bale wrapping mechanism for wrapping the cylindrical package of crop material to form a bale. More particularly the invention is directed to a wrapping mechanism comprising a tape supply assembly having at least two rolls of tape, and a tape dispensing assembly having at least two tape dispensers for dispensing tape from the rolls into the bale forming chamber along at least two predetermined paths around the periphery of the cylindrical package of crop material to form a bale.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
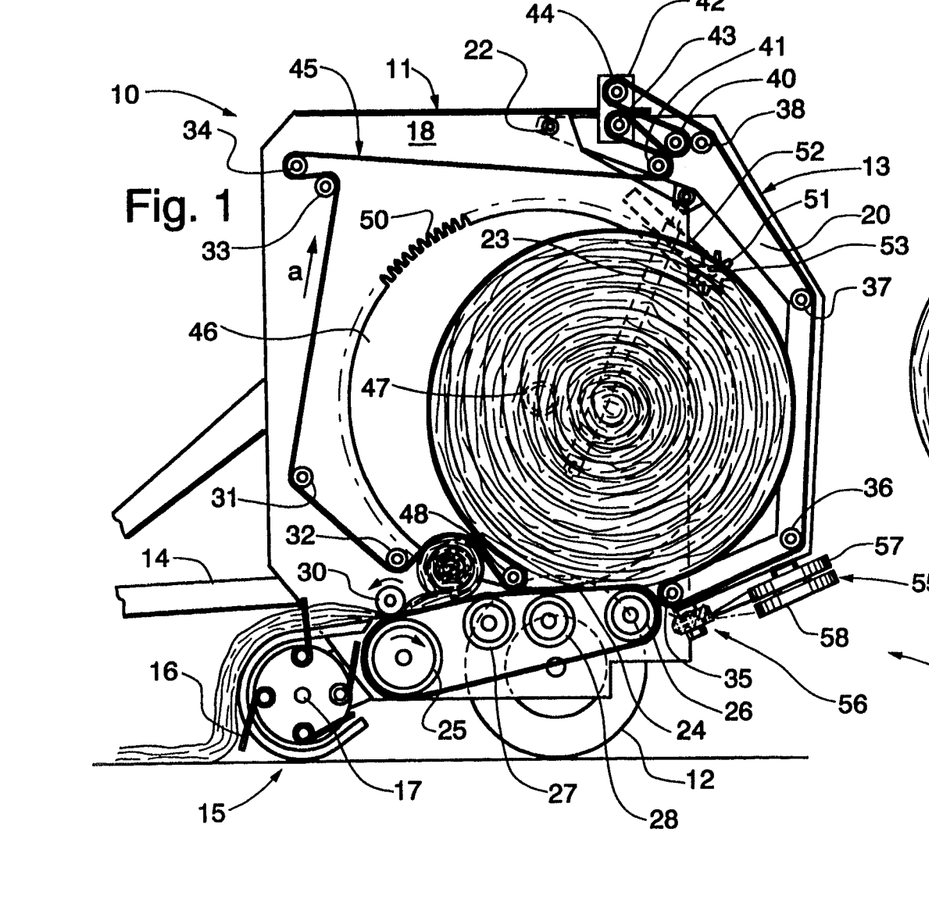
FIG. 1 is a diagrammatic side elevational view of a round baler in which the present invention is embodied.

Referring to the drawings, FIG. 1 shows a round baler 10 in which the present invention is embodied. Baler 10 has an expandable chamber defined by sidewalls, belts and a floor conveyor, of the type disclosed in U.S. Pat. No. 4,597,254, issued Jul. 1, 1986 in the name of Donald F. Bowden, Jr., and incorporated herein by reference. Some aspects of the Bowden baler are similar to the baler disclosed in U.S. Pat. No. 3,914,926 issued Oct. 28, 1975 in the name of Benjamin A. Braunberger, et al, which patent is also incorporated herein by reference.

Round baler 10 includes a main body portion comprising a frame 11, supported by a pair of wheels 12, and an auxiliary body portion comprising a tailgate 13. A tongue 14 is provided on the frame 11 for connection to a tractor. A pickup device 15 mounted on frame 11 includes a plurality of tines 16 rotatable about a shaft 17 for engaging and picking up crop material.

Frame 11 includes a pair of sidewalls 18 which are vertically oriented and spaced apart. Tailgate 13 includes a first side member 20 and a second side member 21 (FIG. 3) rigidly connected together by cross members (not shown) and pivotally connected by stub shafts 22 to sidewalls 18. A pair of hydraulic cylinders 23 are connected between sidewalls 18 and the side members for moving tailgate 13 between closed (FIG. 1) and open positions, the latter of which is shown in the Bowden patent.

Lower bale forming means such as a conveyor 24 in the form of an endless belt extends between sidewalls 18 and is supported on front and rear rollers 25 and 26, respectively, rotatably mounted on frame 11. The upper run of conveyor 24 is supported between front and rear rollers 25, 26 by intermediate rollers 27 and 28, also rotatably mounted on frame 11. A press roller 30 is mounted above front roller 25 to compress incoming crop material. Press roller 30 and front roller 25 are connected by conventional drive means (not shown) to a tractor power take off (PTO) imparting rotation in the directions indicated in FIG. 1, i.e., the upper run of conveyor 24 moves rearwardly.

Now turning to the bale forming apron, a plurality of rollers 31, 32, 33, 34 extend between and are rotatably supported on sidewalls 18. Another plurality of rollers 35, 36, 37, 38, 40, 41 extend between and are rotatably supported on the side members of tailgate 13. Shuttle members 42 are slidably mounted on sidewalls 18 for back and forth movement in a substantially horizontal direction near the top of frame 11. A pair of rollers 43, 44 extend between and are rotatably carried by shuttle members 42. A series of endless belts 45 extend around the aforementioned rollers in a side-by-side, spaced apart arrangement between sidewalls 18 and the side members. Selected rollers are connected to the tractor PTO by drive means (not shown) to drive belts 45 in the direction indicated by arrow a in FIG. 1. Shuttle members 42 are urged forwardly by spring mechanisms (not shown) to maintain a predetermined level of tension in belts 45.

Baler 10 further comprises a pair of disks 46 disposed inside frame 11 closely adjacent and parallel to sidewalls 18. Each disk is in the form of a flat circular plate. The disks 46 are fixed at their centers to stub shafts 47 which in turn are rotatably mounted in bearing members mounted in sidewalls 18. An indexing member 48 in the form of a transverse roller is rotatably connected between disks 48 at a location radially outward from stub shafts 47. Teeth 50 formed on the peripheral edges of disks 46 mesh with sprockets 51 rotatably mounted on brackets 52 attached to sidewalls 18. Sprockets 51 are connected by a cross shaft 53, one end of which is coupled to an electric clutch and brake device (not shown) selectively operated as either a clutch to allow shaft 53 and sprockets 51 to be rotated or as a brake to hold shaft 53 and sprockets 51 stationary.

With reference to FIG. 1, it will be seen that belts 45 pass underneath indexing member 48 so that a lower span of belts 45 running from indexing member 48 to roller 32 moves in a direction substantially opposite to the direction of the upper run of conveyor 24 causing crop material to be coiled in the manner shown to start a bale before the previously formed package is wrapped. To accomplish this the lower span of belts 45 is expandable in length during bale formation in the manner described in the aforementioned Bowden patent.

Figure 2:
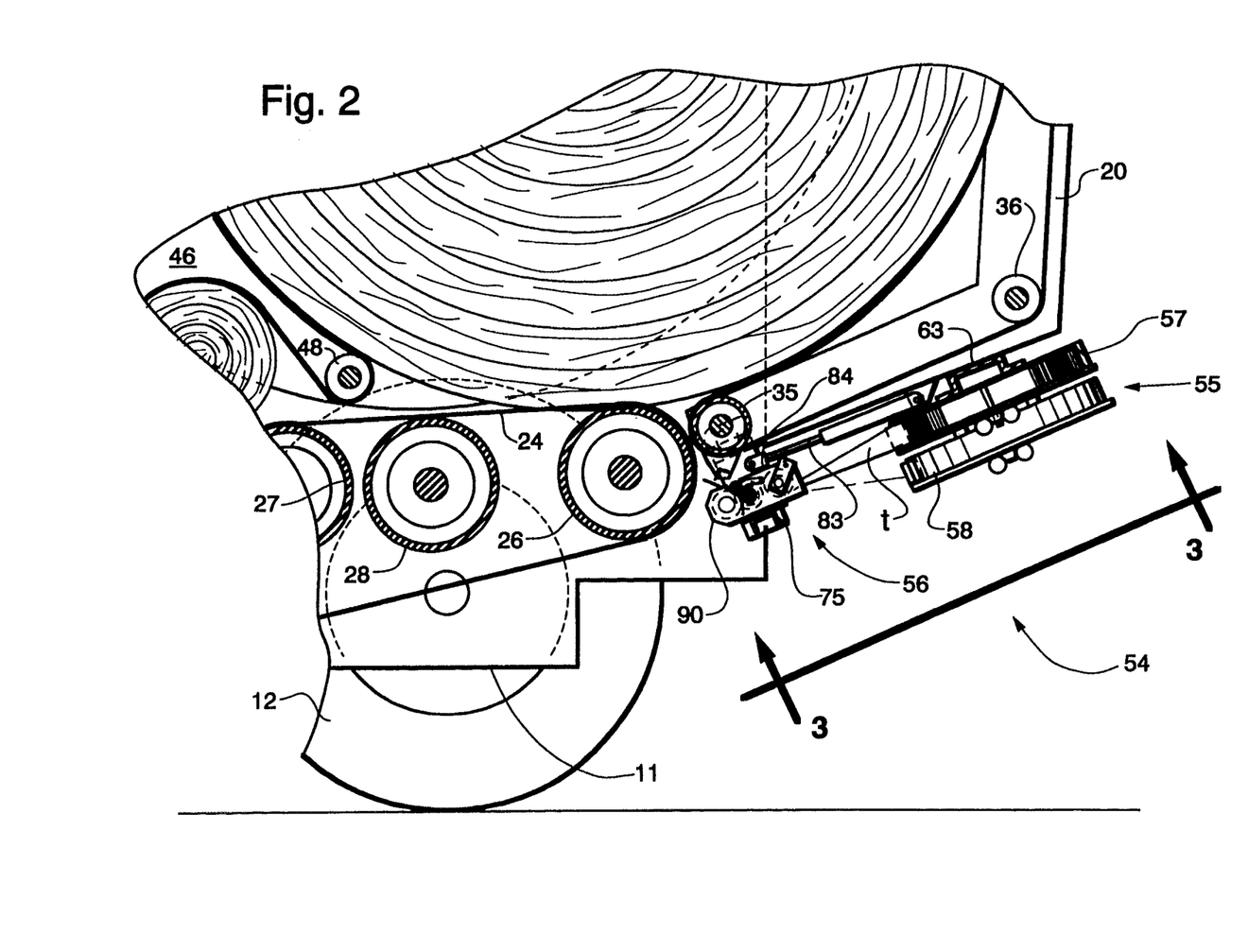
FIG. 2 shows in further detail a particular part of the side elevational view of the round baler shown in FIG. 1.
Figure 3:
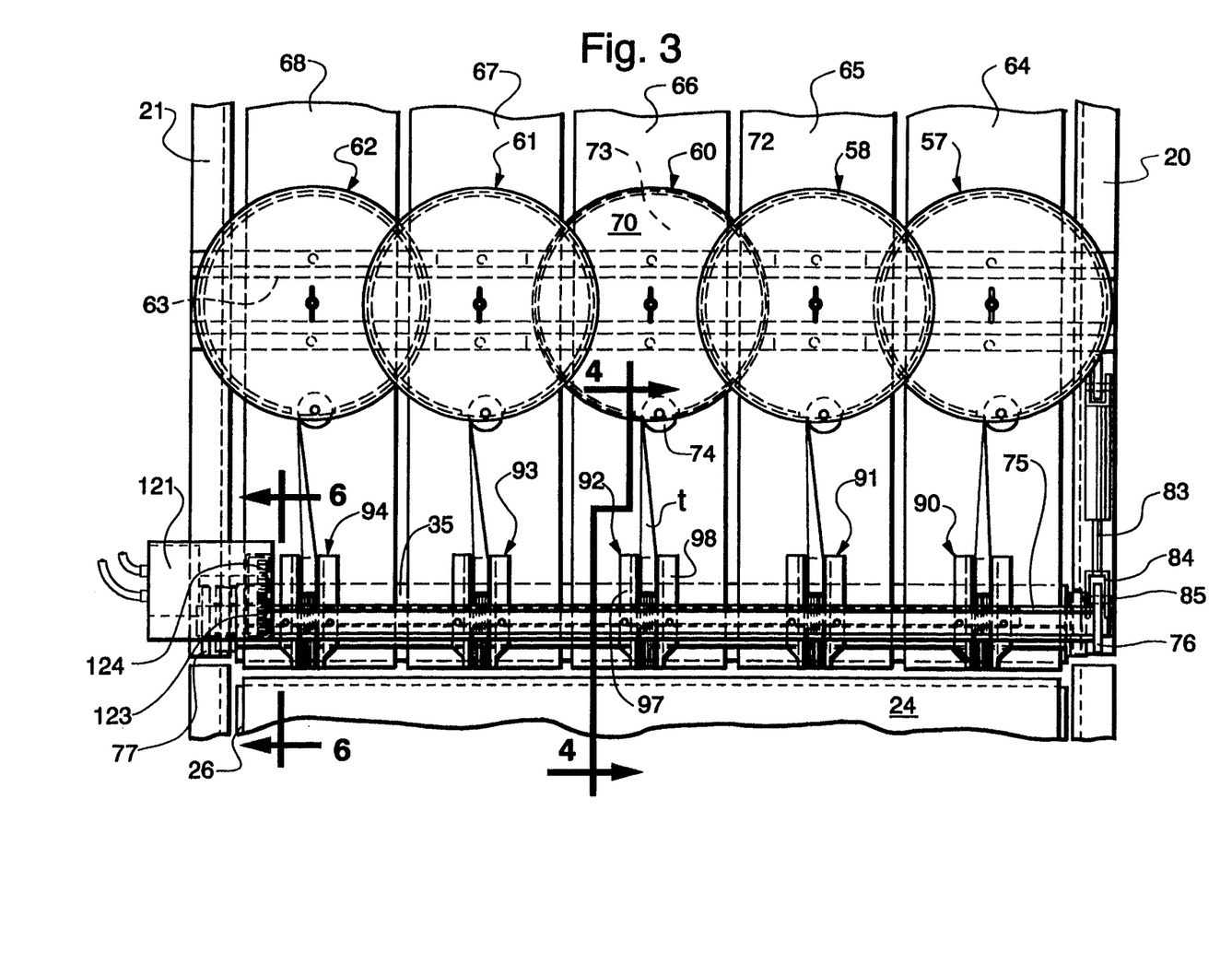
FIG. 3 is a view taken in the direction of arrows 3—3 in FIG. 2.

Referring to FIGS. 1 & 2, a bale wrapping mechanism 54, attached to the lower end of tailgate 13, comprises a tape supply assembly 55 and a tape dispensing assembly 56. Referring now to FIG. 3, tape supply assembly 55 includes five tape supply canisters 57, 58, 60, 61, 62, each removably mounted on a crosspiece 63 affixed to side members 20, 21. Each canister is aligned with and adjacent to a corresponding belt 64, 65, 66, 67, 68 of the series of side-by-side endless belts 45. The tape supply canisters each consist of a top wall 70 (using only canister 60 as an example), a bottom wall 71 (see FIG. 4) and a cylindrical side wall 72 (canister 58), and are alternately offset as shown in FIG. 3. Each canister accommodates a roll of tape 73 (see FIG. 4) and a tape issuing reel 74. The tape from each individual canister issues to one of a plurality of associated tape dispensers, all of which are mounted on a cross beam 75 extending between first and second opposing side arms 76, 77 mounted to rotate on first and second stub shafts 78, 80, shown in FIGS. 4 and 6, respectively. The entire dispensing assembly 56, shown in FIG. 4 in the rest position, is pivoted about the stub shafts between operative position 81 and cutting position 82, both of which are shown in phantom outline. Pivotal motion is imparted by extension and retraction of an actuator rod 83 which is pivotally mounted to first opposing side arm 76 by a bracket 84 and a journal 85. FIG. 5 shows dispensing assembly 56 pivotally moved into the space between roller 35 and rear roller 26 to its operative position for dispensing, which movement takes place after tailgate 13 has partially opened to create such space through which tape is ultimately dispensed.

Figure 4:
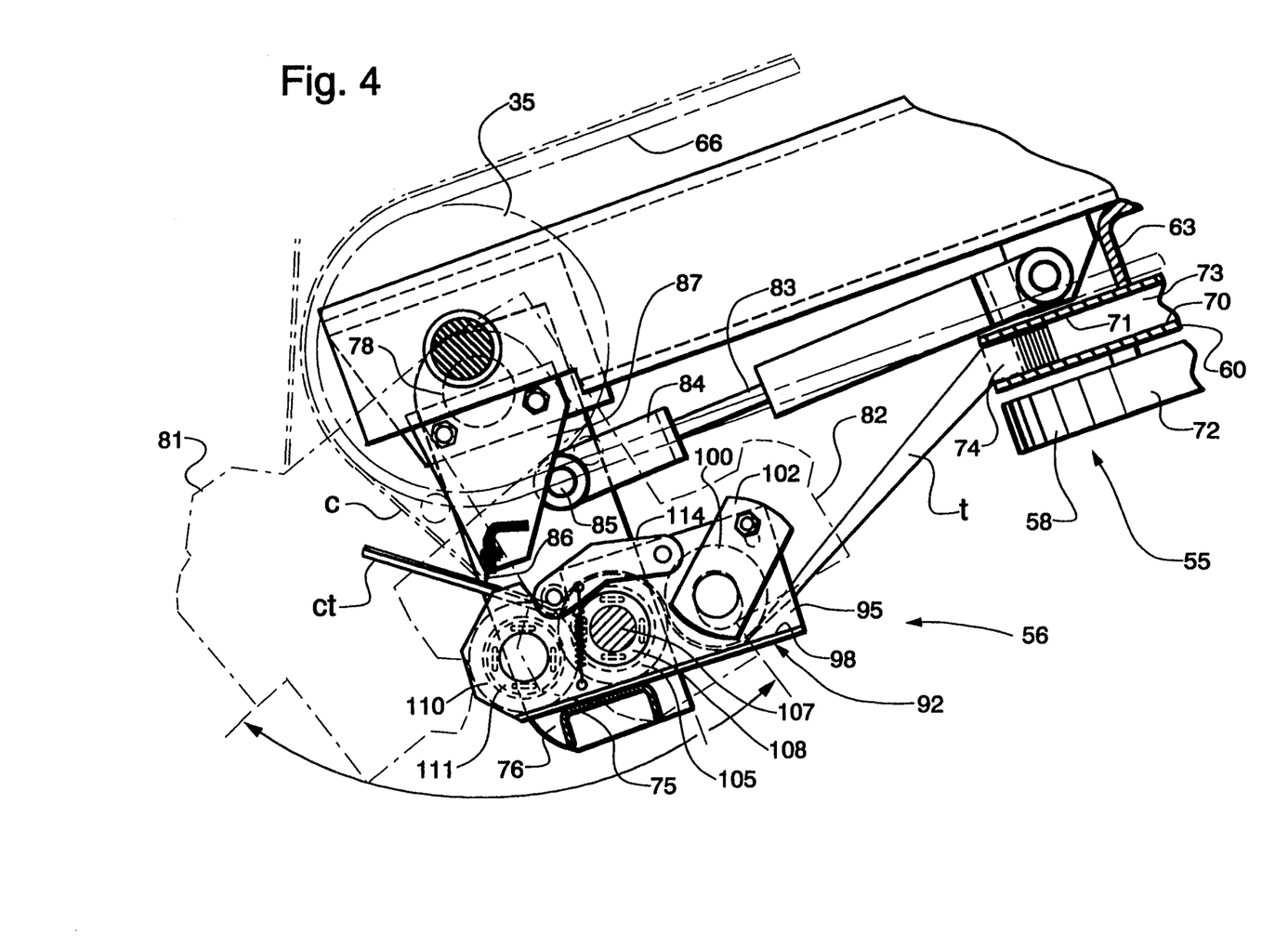
FIG. 4 is a view taken in the direction of arrows 4—4 in FIG. 3.
Figure 5:
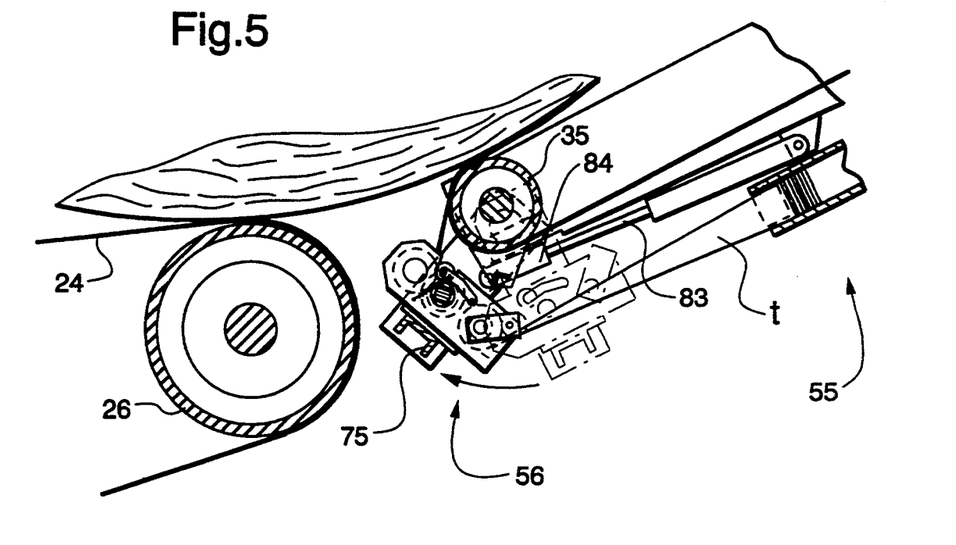
FIG. 5 is a partial side elevational view of the bale wrapping mechanism shown on the baler in FIG. 1.
Figure 6:
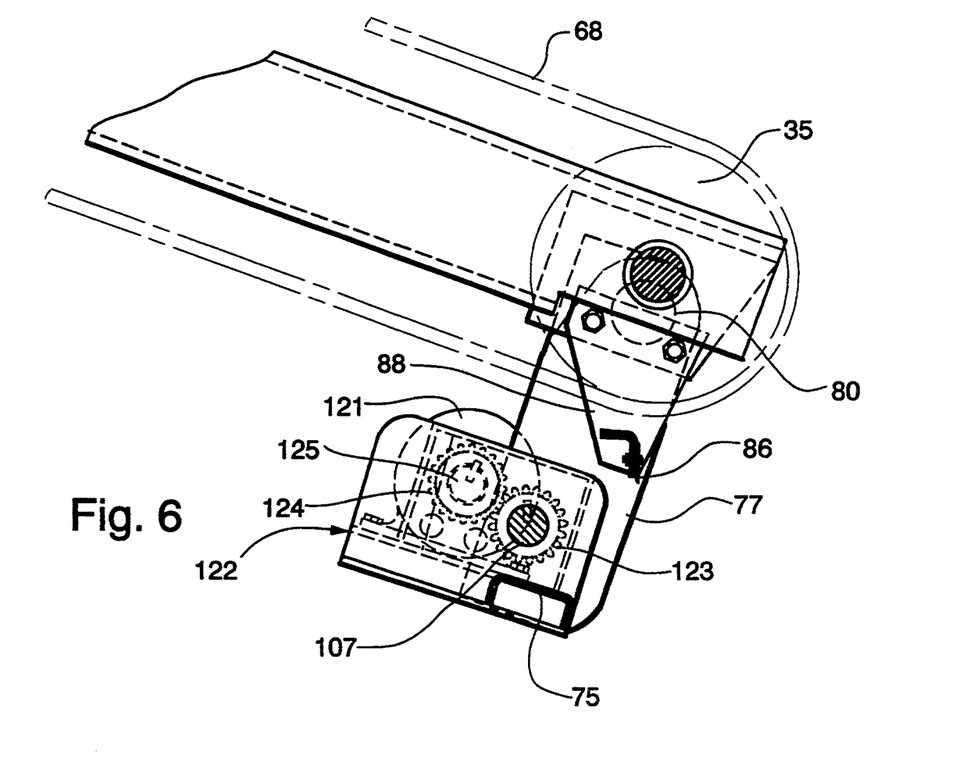
FIG. 6 is a view taken in the direction of arrows 6—6 in FIG. 3.

A knife 86, also extending transverse to the path of the endless belts, is mounted via fixed brackets 87, 88, see FIGS. 4 & 6, respectively. The tapes from all the dispensers are simultaneously cut when dispensing assembly 56 is pivoted to cutting position 82, shown in phantom in FIG. 4, thereby pulling the tapes against the cutting edge of knife 86, as discussed below.

Figures 7, 8:
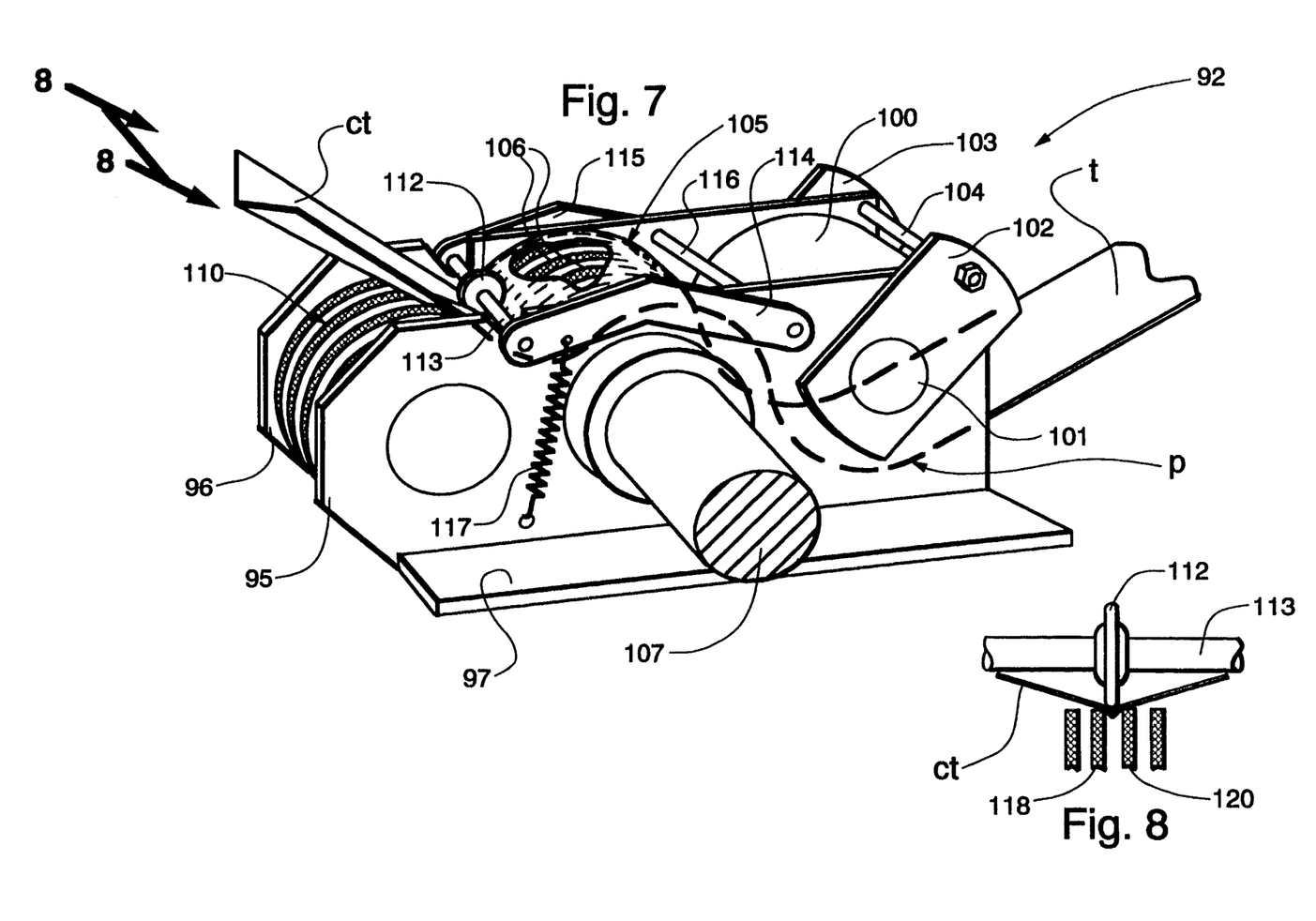
FIG. 7 is a perspective view of a tape dispenser.
FIG. 8 is a view taken in the direction of arrows 8—8 in FIG. 7.

More specifically, tape dispensing assembly 56 comprises a plurality of identical tape dispensers 90, 91, 92, 93, 94, each of which comprises similar elements. For the purposes of this description dispenser 92, shown in FIG. 4, is depicted in perspective in FIG. 7 to more clearly illustrate its elements. Opposing support members 95, 96 are secured to cross beam 75 by integral flanges 97, 98 (the latter of which is shown in FIG. 3). A feed roll 100 is mounted for rotation on a shaft 101 affixed to a pair of legs 102, 103 pivotal about rod 104 extending between opposing support members 95, 96. Also mounted for rotation between opposing support members 95, 96 is a driven disc pack 105 comprising a plurality of side-by-side driven discs 106, having knurled outer surfaces. Disc pack 105 is mounted to a drive shaft 107 via a one way sprag clutch assembly 108. A second disc pack 105 mounted between opposing support members 95, 96 comprise a similar plurality of side-by-side knurled discs that intermesh with driven discs 106. Disc pack 110, also mounted for one way rotation via a sprag clutch 111 (FIG. 4), is driven in a conventional manner by gearing (not shown) that couples the shaft that drives disc pack 110 to shaft 107. Disc pack 110 is driven 20 to 30% faster than disc pack 105 for the reason discussed below. Completing dispenser 92 is a crease wheel 112 mounted for rotation on shaft 113 extending between arms 114, 115 that rotate about rod 116. A spring 117 loads crease wheel 112 downwardly against the overlapping nip of the discs of disc pack 105 and second disc pack 110. Wheel 112 is disposed between the two centrally located discs 118, 120 of second disc pack 110. As illustrated in FIG. 8, this relationship places a crease in tape ct for the purposes of rigidity as it is being dispensed.

A motor 121 is affixed to cross beam 75 via a mounting bracket assembly 122 (FIG. 6) for conjoint movement therewith. Shaft 107 is driven via driven gear 123 intermeshing with a drive gear 124 on the output shaft 125 of the motor.

In operation, baler 10 is towed across a field by a tractor, pickup 15 delivers crop material between press roller 30 and conveyor 24. The upper run of conveyor 24 carries the crop material rearwardly into a bale starting zone where it is engaged by the lower span of belts 45 which are traveling in a forward direction. This causes coiling of the crop material to form the core of a bale. During this stage the electric clutch and brake device (not shown) is operated as a brake so that disks 46 are held stationary by sprockets 51 and indexing member 48 is located in its home position causing belts 45 to be pinched against the upper run of conveyor 24 to close off the rear of the bale starting zone as shown in FIG. 1. As the bale increases in diameter, shuttle members 42 move rearward along the top of frame 11 to the position shown in FIG. 1 allowing the lower span of belts 45 to expand around the periphery of the cylindrical package of crop material being formed.

When a package of crop material reaches a predetermined diameter, the electric clutch and brake device is operated as a clutch and sprockets 51 are driven causing rotation of disks 46 in a counter-clockwise direction and movement of indexing member 48 from its home position in a substantially circular path of travel generally about the periphery of the cylindrical package of crop material. Initial rotation of disks 46 moves indexing member 48 out of engagement with belts 45 while crop material continues to be delivered to the forming chamber. When indexing member 48 is continued in its circular path, the cylindrical package will have moved slightly rearward (as described in the Bowden patent mentioned above). At this point, indexing member 48 has been returned to the home position shown in FIG. 1. The bale starting zone is now reformed and a new bale can be started during wrapping. Tailgate 13 is moved to the partial open position shown in FIG. 5 by incrementally extending hydraulic cylinders 23. Wrapping is initiated subsequent to which a completed bale is discharged from baler 10 and tailgate 13 is moved back to its closed position while the baling operation continues without interruption.

More specifically, the wrapping operation entails each of the supply canisters 58, 60, 61, 62, 63 issuing tape to its associated tape dispenser 90, 91, 92, 93, 94, respectively. The tape t follows the path p shown in FIG. 7, i.e., under feed roll 100, over driven disc pack 105 and out between second disc pack 110 and crease wheel 112. The adhesive side of the tape is facing outwardly relative to roll 100 and facing inwardly with respect to disc packs 105 and 110, i.e., engaging the knurled edges thereof. To avoid unwanted adherence of the tape to the discs of disc pack 110 the rotational speed of disc pack 110 is 20 to 30% greater than the speed of the tape as it is being moved along path p by the discs in disc pack 105.

Figure 9:
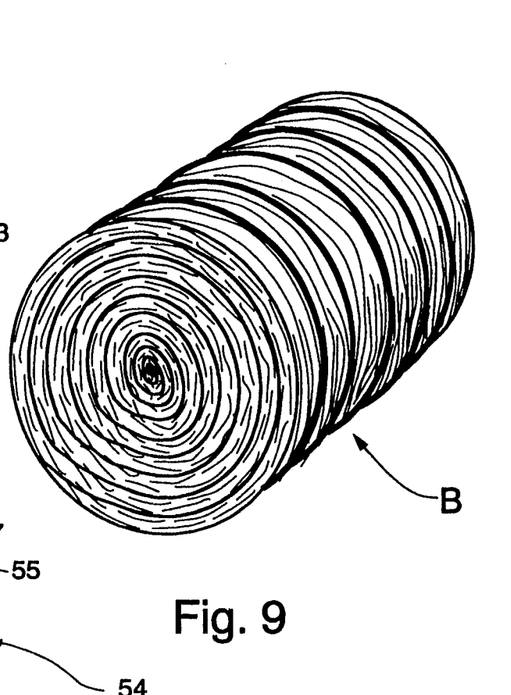
FIG. 9 is a perspective view of a round bale formed by a baler in which the present invention is embodied.

Initially the end of the tape, designated ct, is maintained in the position shown in FIGS. 7 and 4 during the time that crop material is being formed into a cylindrical package in the chamber. Wrapping is initiated by rotating dispensing assembly 56 to the position shown in FIG. 5, whereupon motor 121 imparts rotation to shaft 107 which in turn rotates disc packs 105 and 110 at the different speeds mentioned, via associated sprag clutch assemblies, causing the ends of the tapes to pay out until they engage the surface of the hay package as it is rotated in the chamber. The adhesive side of the tape engages the moving hay surface and is thereby pinched between the nip of the cylindrical crop surface and the belts as they travel around roller 35, as illustrated in FIG. 5. The sprag clutches are designed to allow the tapes to be dispensed at the surface speed of the crop material. The tape continues to feed out of the dispensers until the ends overlap with the tape being dispensed. At a desired time after a preselected amount of overlapping tape has been dispensed, the dispensing assembly is rotated to cutting position 82, shown in phantom in FIG. 4, which causes the tape path to change to path c shown in phantom in FIG. 4. This brings the cutting edge of knife 86 into contact with the tapes, which are simultaneously severed. The motor continues to drive all dispensers and feed the tapes until the severed ends reach the wrap initiate position shown in FIG. 7. The tape dispensers are returned to the home position (shown in solid lines in FIG. 4) by actuator rod 83 as tail gate 13 is opened to discharge the bale B wrapped by a plurality of tapes as shown in FIG. 9. The tailgate is then repositioned to the condition shown in FIGS. 1 and 2 with the gap closed between rear roller 26 and roller 45. At this point, bale wrapping mechanism 54 is again poised to initiate wrapping.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. In a baler for forming cylindrical bales of crop material, said baler including
   lower bale forming means,
   upper bale forming means cooperating with said lower bale forming means to define a bale forming chamber,
   means for feeding crop material into said bale forming chamber to form a cylindrical package of crop material, and
   improved bale wrapping mechanism for wrapping said cylindrical package of crop material to form a bale, said improved wrapping mechanism comprising
   a tape supply assembly comprising at least two rolls of tape, and
   a tape dispensing assembly comprising at least two tape dispensers for dispensing tape from said rolls into said bale forming chamber along at least two predetermined paths around the periphery of said cylindrical package of crop material to form a bale.

2. A baler as set forth in claim 1 wherein said baler further includes
   a main frame on which said lower bale forming means is mounted, and
   a tailgate pivotally mounted on said main frame,
   said upper bale forming means mounted partly on said main frame and partly on said tailgate,
   said bale wrapping mechanism mounted on said tailgate.

3. A baler as set forth in claim 2 wherein said baler further includes means for pivoting said tailgate to provide a space through which said tape is dispensed from said dispenser to said periphery of said cylindrical package.

4. A baler as set forth in claim 3 wherein said space is defined by said lower bale forming means and said upper bale forming means.

5. A baler as set forth in claim 4 wherein mounting means are provided for mounting said tape dispensing assembly in a home position, and
   means are provided for moving said mounting means from said home position to an operative position at which operative position said tape dispensing assembly is disposed in said space and reduces the length of the part of said path of the tape that extends between said dispensers and said cylindrical package of hay.

6. A baler as set forth in claim 5 wherein said improved wrapping mechanism further comprises cutting means having knife means for simultaneously cutting said at least two tapes after having been dispensed around more than one complete traversal of said periphery of said cylindrical hay package.

7. A baler as set forth in claim 6 wherein means are provided for mounting said cutting means on said tailgate, and said means for moving said mounting means moves said dispensing assembly from said operating position to a cutting position in which said tapes engage said knife means to sever said tapes.

8. A baler as set forth in claim 2 wherein each of said at least two tape dispensers receives tape from a particular one of said at least two rolls of tape.

9. A baler as set forth in claim 8 wherein said tape is self adhering,

10. A baler as set forth in claim 9 wherein one side of said tape is provided with an adhesive medium and said tape is dispensed from said dispensers with said one side generally parallel to the periphery of said cylindrical package.

11. A baler as set forth in claim 10 wherein said at least two predetermined paths are substantially parallel to each other and in separate planes that are normal to the axis of the cylindrical package which enables said tape to adhere to itself after having traversed the entire circumference of said cylindrical package.

12. A baler as set forth in claim 1 wherein each of said at least two tape dispensers receives tape from a particular one of said at least two rolls of tape.

13. A baler as set forth in claim 12 wherein said tape is self adhering.

14. A baler as set forth in claim 13 wherein one side of said tape is provided with an adhesive medium and said tape is dispensed from said dispensers with said one side generally parallel to the periphery of said cylindrical package.

15. A baler as set forth in claim 14 wherein said at least two predetermined paths are substantially parallel to each other and in separate planes that are normal to the axis of the cylindrical package which enables said tape to adhere to itself after having traversed the entire circumference of said cylindrical package.

16. A baler as set forth in claim 1 wherein said improved wrapping mechanism further comprises cutting means for simultaneously cutting said at least two tapes after having been dispensed around more than one complete traversal of said periphery of said cylindrical hay package.

* * * * *